US012711649B2

(12) United States Patent
Lim

(10) Patent No.: US 12,711,649 B2
(45) Date of Patent: Aug. 18, 2026

(54) IMAGE ANALYSIS SERVER, OBJECT COUNTING METHOD USING IMAGE ANALYSIS SERVER, AND OBJECT COUNTING SYSTEM

(71) Applicant: MEDILITY INC, Seoul (KR)

(72) Inventor: Sang Kyu Lim, Seoul (KR)

(73) Assignee: MEDILITY INC, Seoul (KR)

( * ) Notice: Subject to any disclaimer, the term of this patent is extended or adjusted under 35 U.S.C. 154(b) by 327 days.

(21) Appl. No.: 18/198,188

(22) Filed: May 16, 2023

(65) Prior Publication Data

US 2023/0306630 A1 Sep. 28, 2023

Related U.S. Application Data

(63) Continuation of application No. PCT/KR2021/010824, filed on Aug. 13, 2021.

(30) Foreign Application Priority Data

Nov. 17, 2020 (KR) ........................ 10-2020-0153982
Nov. 17, 2020 (KR) ........................ 10-2020-0153993

(51) Int. Cl.
*G06T 7/70* (2017.01)
*G06T 7/50* (2017.01)
(Continued)

(52) U.S. Cl.
CPC .................. *G06T 7/70* (2017.01); *G06T 7/50* (2017.01); *G06T 7/62* (2017.01); *G06V 10/25* (2022.01);
(Continued)

(58) Field of Classification Search
CPC ........ G06V 10/82; G06V 20/53; G06V 10/70; G06V 10/764; G06V 10/87; G06V 10/25;
(Continued)

(56) References Cited

U.S. PATENT DOCUMENTS 9,842,257 B2 * 12/2017 Gershtein .............. G06V 20/20
11,010,641 B2 * 5/2021 Buslaev ................ G06V 20/20
(Continued)

FOREIGN PATENT DOCUMENTS

CN 110909591 A 3/2020
CN 111860344 A 10/2020
(Continued)

OTHER PUBLICATIONS

Follmann, Patrick, and Rebecca KÃ¶nig. "Oriented boxes for accurate instance segmentation." arXiv preprint arXiv:1911.07732 (2019). (Year: 2019).*

(Continued)

*Primary Examiner* — Sumati Lefkowitz
*Assistant Examiner* — Connor L Hansen
(74) *Attorney, Agent, or Firm* — Banner & Witcoff, Ltd.

(57) ABSTRACT

An image analysis server, an object counting method using the image analysis server, and an object counting system are provided, in which the object counting method using the image analysis server includes, by a user terminal, inputting an image including one or more objects, by an image analysis server, forming a plurality of boxes for each of the objects, and keeping only the number of boxes corresponding to the objects and deleting the other boxes of the plurality of boxes, and by the image analysis server, counting the number of the remaining boxes and transmitting the corresponding number of the boxes to the user terminal.

20 Claims, 15 Drawing Sheets

(51) Int. Cl.
*G06T 7/62* (2017.01)
*G06V 10/25* (2022.01)
*G06V 10/74* (2022.01)

(52) U.S. Cl.
CPC .. *G06V 10/761* (2022.01); *G06T 2207/30242* (2013.01)

(58) Field of Classification Search
CPC ........ G06V 10/454; G06V 20/60; G06T 7/70; G06T 2207/30242; A61J 1/03; A61J 7/02
See application file for complete search history.

(56) References Cited

U.S. PATENT DOCUMENTS

| | | | | |
|---|---|---|---|---|
| 2001/0041968 | A1 | 11/2001 | Hamilton | |
| 2012/0216485 | A1 | 8/2012 | Amano et al. | |
| 2016/0343120 | A1 | 11/2016 | Johnson | |
| 2017/0079885 | A1 * | 3/2017 | Thompson ................ | A61J 7/02 |

FOREIGN PATENT DOCUMENTS

| | | | |
|---|---|---|---|
| JP | H07282196 | A | 10/1995 |
| JP | 2019-076568 | A | 5/2019 |
| KR | 10-2011-0000789 | A | 1/2011 |
| KR | 10-2012-0104522 | A | 9/2012 |
| KR | 101396713 | B1 | 5/2014 |
| KR | 10-2018-0020017 | A | 2/2018 |
| KR | 101825459 | B1 | 3/2018 |
| KR | 10-2020-0075072 | A | 6/2020 |
| KR | 2020-0119369 | A | 10/2020 |

OTHER PUBLICATIONS

Ou, YangâYen, et al. “Automatic drug pills detection based on enhanced feature pyramid network and convolution neural networks.” IET Computer Vision 14.1 (2020): 9-17. (Year: 2020).*

Khaki, Saeed, et al. “Convolutional neural networks for image-based corn kernel detection and counting.” Sensors 20.9 (2020): 2721. (Year: 2020).*

Ou, Yang Yen, et al. “Automatic drug pills detection based on enhanced feature pyramid network and convolution neural networks.” IET Computer Vision 14.1 (2020): 9-17. (Year: 2020).*

Sep. 19, 2024—(CA) Office Action—U.S. Pat. No. 3, 198,777.

Ou et al “Automatic Drug Pills Detection based on Convolution Neural Network”, Downloaded on Oct. 31, 2022 at 09:19:09 UTC from IEEE Xplore, pp. 1-4.

Nov. 14, 2025 (CN) Office Action, App No. 202180076688.X, with English translation, 10 pages.

* cited by examiner

IMAGE ANALYSIS SERVER, OBJECT COUNTING METHOD USING IMAGE ANALYSIS SERVER, AND OBJECT COUNTING SYSTEM

CROSS-REFERENCE TO RELATED APPLICATION

The present application is a continuation of International Patent Application No. PCT/KR2021/010824, filed Aug. 13, 2021, which is based upon and claims the benefit of priority to Korean Patent Applications Nos. 10-2020-0153982, filed on Nov. 17, 2020, and 10-2020-0153993, filed on Nov. 17, 2020. The disclosures of the above-listed applications are hereby incorporated by reference herein in their entirety.

TECHNICAL FIELD

The present disclosure relates to an image analysis server, an object counting method using the image analysis server, and an object counting system.

BACKGROUND

In this aging society, patient visits to hospitals are increasing, and accordingly, the types and number of drugs administered are also increasing.

Meanwhile, in small pharmacies or hospitals, there occurs inconvenience of having to manually count the number of pills when administering pills to patients or conducting inventory. In addition, when a person manually counts pills, mistakes such as taking less than or more than a prescribed number of pills often occur.

In order to solve this problem, large-scale pharmacies and hospitals adopt and use pill-counting devices, but these devices are too expensive and it is practically difficult to purchase and use the devices in small pharmacies or hospitals.

SUMMARY

In order to address one or more problems (e.g., the problems described above and/or other problems not explicitly described herein), the present disclosure provides an image analysis server capable of simply counting the number of objects (e.g., pills) without requiring use of complex and expensive devices, an object counting method using the image analysis server, and an object counting system.

In addition, the present disclosure provides an image analysis server capable of accurately counting the number of objects (e.g., pills) placed close to each other, an object counting method using the image analysis server, and an object counting system.

An object counting method using an image analysis server may be provided, in which the method may include, by a user terminal, inputting an image including one or more objects, by an image analysis server, forming a plurality of boxes for each of the objects, and keeping only the number of boxes corresponding to the objects and deleting the other boxes of the plurality of boxes, and by the image analysis server, counting the number of the remaining boxes and transmitting the corresponding number of the boxes to the user terminal.

In addition, the forming the plurality of boxes for each of the objects, and keeping only the number of boxes corresponding to the objects and deleting the other boxes of the plurality of boxes by the image analysis server may include, by a box setting module, forming a plurality of boxes for each of the objects by executing an object recognition deep learning model.

In addition, the object counting method using the image analysis server may include, after the forming the plurality of boxes for each of the objects, by a first box removal module, executing an algorithm for removing some of the plurality of boxes formed for each of the objects.

In addition, the method may include, after the executing the algorithm for removing some of the plurality of boxes formed for each of the objects by the first box removal module, by a second box removal module, keeping only one box for each object and deleting the other boxes.

In addition, the keeping only one box for each object and deleting the other boxes by the second box removal module may include, by a reference box setting unit, setting any of the remaining boxes as a reference box; by an aggregation box setting unit, setting an aggregation box which is a set of boxes overlapping with the reference box, by a comparison space setting unit, removing an overlapping space with the aggregation box from a space occupied by the reference box and setting the remaining space of the reference box as a comparison space, and by a pill coefficient comparison-based box removal unit, if a ratio of the comparison space to the space occupied by the reference box is greater than a pill coefficient, keeping the box that is set as the reference box, and if the ratio of the comparison space to the space occupied by the reference box is smaller than the pill coefficient, removing the box that is set as the reference box.

In addition, the object recognition deep learning model executed by the box setting module may be RetinaNet.

In addition, the algorithm for removing some of the plurality of boxes formed in each object by the first box removal module may be non-maximum suppression (NMS).

In addition, pill coefficients may be stored in a database in accordance with sizes and shapes of the objects, and a pill coefficient determination module may match the pill coefficients stored in the database in accordance with the sizes and shapes of the objects appearing in the image.

An image analysis server may be provided, which may be configured to receive an image including one or more objects from a user terminal, form a plurality of boxes for each of the objects, keep only the number of boxes corresponding to the objects and delete the other boxes of the plurality of boxes, and count the number of remaining boxes and transmit the corresponding number of the boxes to the user terminal.

In addition, the image analysis server may include a box setting module that forms a plurality of boxes for each of the objects by executing an object recognition deep learning model, a first box removal module capable of executing an algorithm for removing some of the plurality of boxes formed for each of the objects, and a second box removal module that keeps only one box for each object and deletes the other boxes.

In addition, the second box removal module may include a reference box setting unit that sets any of the remaining boxes as a reference box, an aggregation box setting unit that sets an aggregation box that is a set of boxes overlapping with the reference box, a comparison space setting unit that removes an overlapping space with the aggregation box from a space occupied by the reference box and set the remaining space of the reference box as a comparison space, and a pill coefficient comparison-based box removal unit that, if a ratio of the comparison space to the space occupied by the reference box is greater than a pill coefficient, keeps the box that is set as the reference box, and if the ratio of the comparison space to the space occupied by the reference box is smaller than the pill coefficient, removes the box that is set as the reference box.

In addition, the image analysis server may further include a database that stores pill coefficients in accordance with sizes and shapes of the objects, and a pill coefficient determination module that matches the pill coefficients stored in the database in accordance with the sizes and shapes of the objects appearing in the image.

According to another example of the present disclosure, there may be provided an object counting system including a user terminal for inputting an image including one or more objects, and an image analysis server that forms a plurality of boxes for each of the objects, keeps only the number of boxes corresponding to the objects and deletes the other boxes of the plurality of boxes, and counts the number of the remaining boxes.

According to some examples of the present disclosure, the image analysis server, the object counting method using the image analysis server, and the object counting system have an effect of simply counting the number of objects (e.g., pills) without requiring use of a complex and expensive device.

In addition, there is an advantage in that the number of objects (e.g., pills) placed close to each other can be accurately counted.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
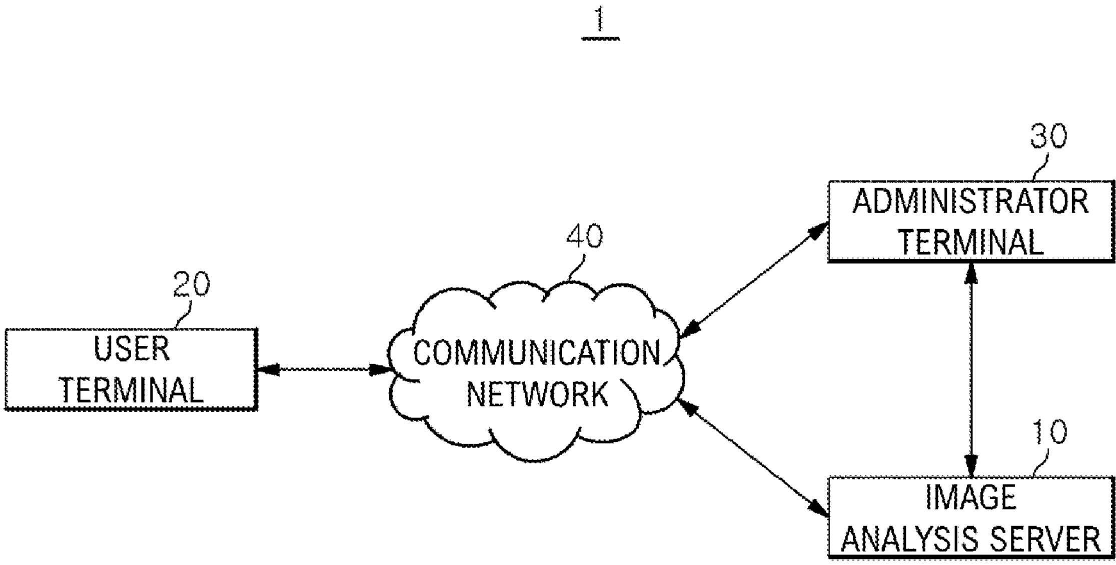
FIG. 1 schematically illustrates an object counting system.

FIG. 1 schematically illustrates an object counting system 1.

Referring to FIG. 1, the object counting system 1 may include an image analysis server 10, a user terminal 20, and an administrator terminal 30.

The image analysis server 10, the user terminal 20, and the administrator terminal 30 may be provided as independent devices and communicate with each other through a communication network 40, or the image analysis server 10 and the administrator terminal 30 may be integrated into one device and may communicate with each other directly.

An example will be described herein, in which the image analysis server 10, the user terminal 20, and the administrator terminal 30 are provided as separate and independent devices.

The object counting system 1 herein may be understood as referring to a system capable of accurately counting the number of objects included in an image.

Specifically, if the user captures an image of the object through the user terminal 20, the image including the captured object may be transmitted to the image analysis server 10, and the number of objects in the image may be counted through an algorithm set by the image analysis server 10.

An example will be described herein, in which the object is a pill having a certain shape. If the object in the image captured by the user terminal 20 is a pill, it can be understood that the object counting system 1 is a pill counting system applicable for use in pharmacies and hospitals.

However, the spirit of the present disclosure is not limited to the above, and the object may include any object in a shape.

The image analysis server 10 may be understood as a server that receives image data from the user terminal 20 and processes data necessary to count the number of objects in the image.

The objects included in one image may be the same type of objects having the same size and shape. That is, the image analysis server 10 may count the same objects included in one image.

However, the spirit of the present disclosure is not limited to the above, and the objects included in one image may be different types of objects having different sizes and shapes, in which case the image analysis server 10 may also count different types of objects included in one image.

The user terminal 20 may capture an image of the objects placed on an object plate to be described below and display it as an image.

In addition, the user terminal 20 may be a device capable of communicating with the image analysis server 10, and may be a mobile terminal or a stationary terminal implemented as a computing device.

For example, the user terminal 20 may include a smart phone, a laptop computer, a tablet PC, a wearable device, a computer, etc., that may include a camera capable of capturing an image of the object. However, the user terminal 20 is not limited to the above examples and may be provided as a separate camera.

The administrator terminal 30 may be understood as a device that is capable of updating functions provided to the user terminal 20 or inputting a command through the image analysis server 10. For example, the administrator terminal 30 may include a smart phone, a laptop computer, a tablet PC, a wearable device, a computer, etc., that may be capable of communicating with the image analysis server 10.

Figure 2:
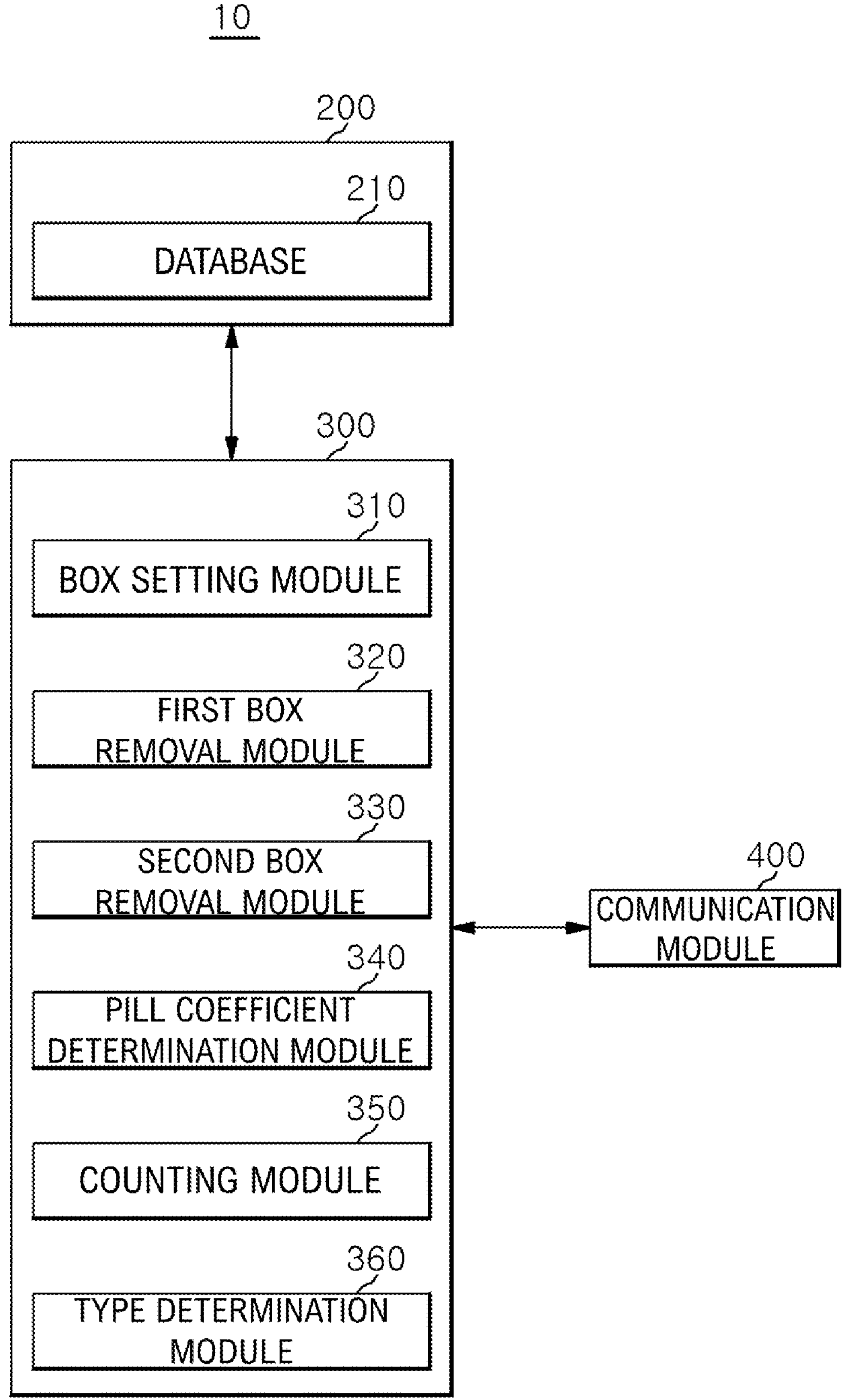
FIG. 2 schematically illustrates a configuration of an image analysis server of FIG. 1.
Figure 3:
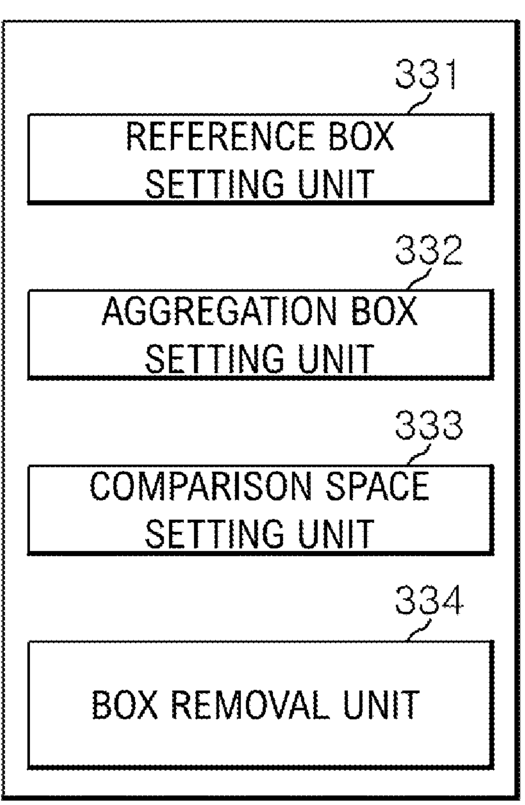
FIG. 3 schematically illustrates a sub-configuration of a second box removal module of the image analysis server of FIG. 2.

FIG. 2 schematically illustrates a configuration of the image analysis server 10 of FIG. 1, and FIG. 3 schematically illustrates a sub-configuration of a second box removal module 330 of the image analysis server 10 of FIG. 2.

Referring to FIGS. 2 and 3, the image analysis server 10 may include a memory 200, a processor 300 and a communication module 400.

The processor 300 may be configured to process the commands of the computer program by performing basic arithmetic, logic, and input and output computations. The commands may be provided to the processor 300 from the memory 200 or the communication module 400. In addition, other commands may be provided to the processor 300 through a communication channel between respective components of the image analysis server 10.

The processor 300 may perform various functions such as inputting and outputting the data required for forming a plurality of boxes for the object, keeping a certain number of boxes that correspond to the object and deleting the other boxes of the plurality of boxes, processing the data, managing the data, and communicating using the communication network 40. Details of the components of the processor 300 for executing this will be described below.

In addition, the components of the processor 300 may include an artificial neural network pre-trained through deep learning. For example, at least one of the components of the processor 300 may be an artificial neural network implementing RetinaNet, and this will be described in detail below.

The memory 200 is a computer-readable recording medium and may include a random access memory (RAM), a read only memory (ROM), and a permanent mass storage device such as a disk drive.

The processor 300 may load program codes stored in the memory 200 and use the loaded program to count the objects or determine the types of objects. The program codes may be loaded from a recording medium (e.g., a DVD, memory card, etc.) readable by a separate computer, or transferred from another device through the communication module 400 and stored in the memory 200.

In addition, the memory 200 may be provided with a database 210 for storing the data required for forming a plurality of boxes for the object and keeping a certain number of boxes that correspond to the object and deleting the other boxes of the plurality of the boxes.

The communication module 400 may provide a function for the user terminal 20 and the image analysis server 10 or the administrator terminal 30 and the image analysis server 10 to communicate with each other through the communication network 40.

The image analysis server 10 may include, as a physical configuration, a box setting module 310, a first box removal module 320, a second box removal module 330, a pill coefficient determination module 340, a counting module 350, and a type determination module 360. In addition, the second box removal module 330 may include a reference box setting unit 331, an aggregation box setting unit 332, a comparison space setting unit 333, and a pill coefficient comparison-based box removal unit 334, which will be described in detail below.

Figure 4:
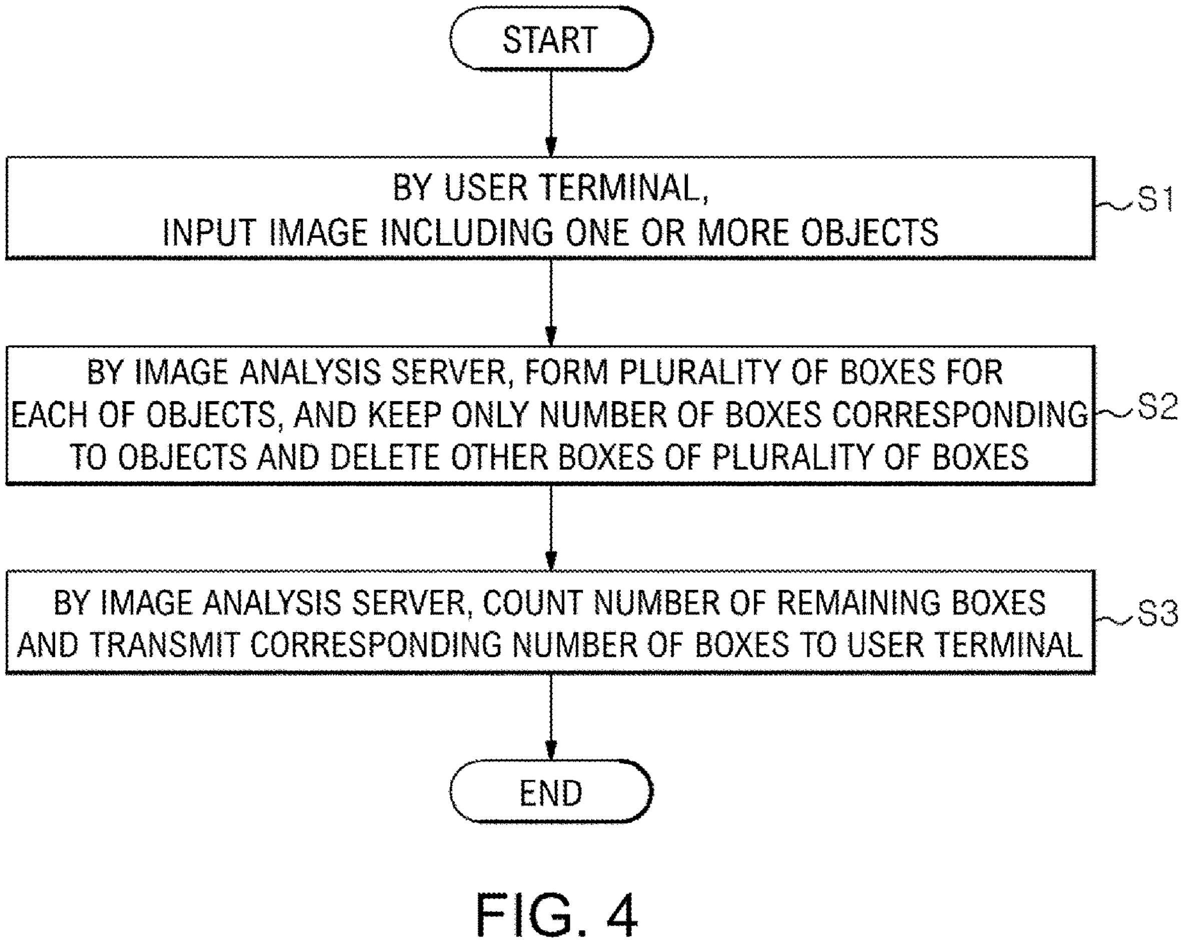
FIG. 4 is a flowchart schematically illustrating an object counting method using an image analysis server, which is executed by the object counting system of FIG. 1.
Figure 5:
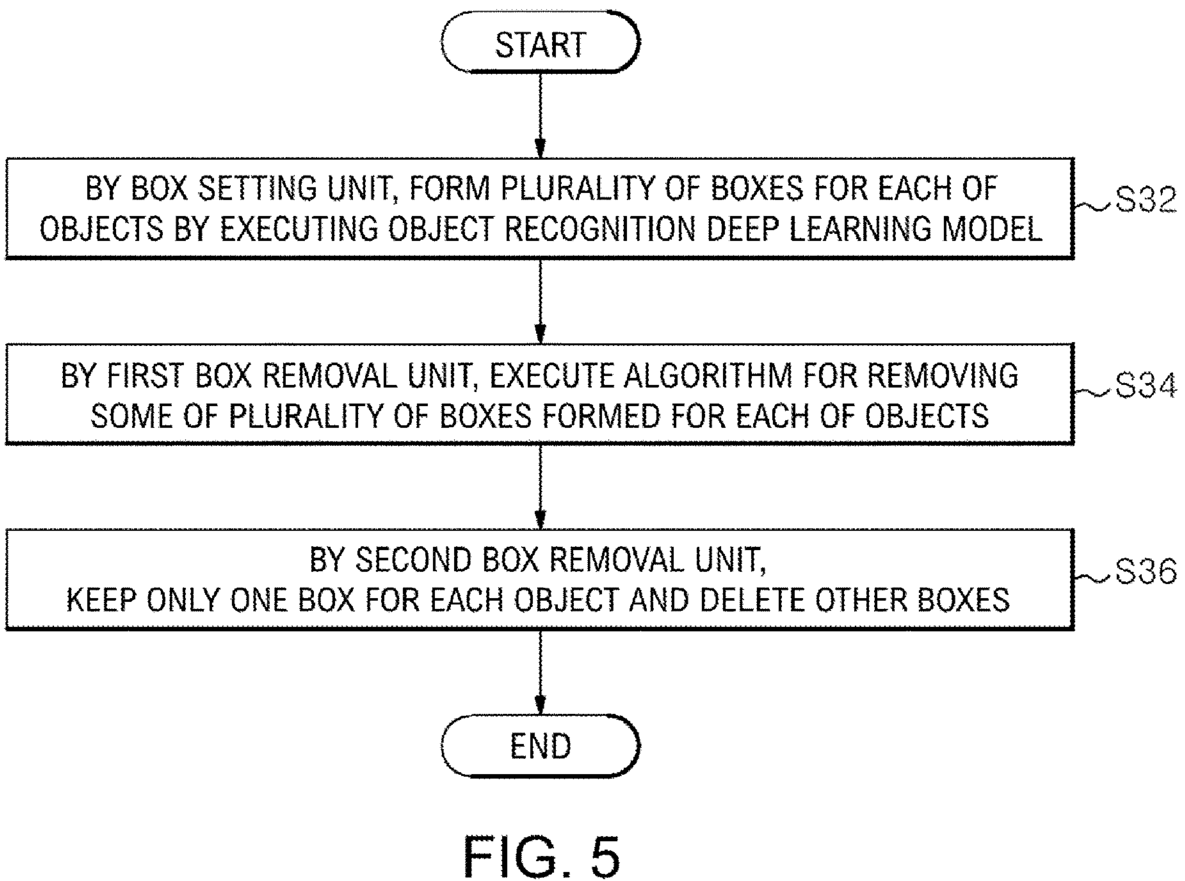
FIG. 5 is a flowchart illustrating in more detail an operation S2 of operations S1 to S3 of FIG. 4.
Figure 6:
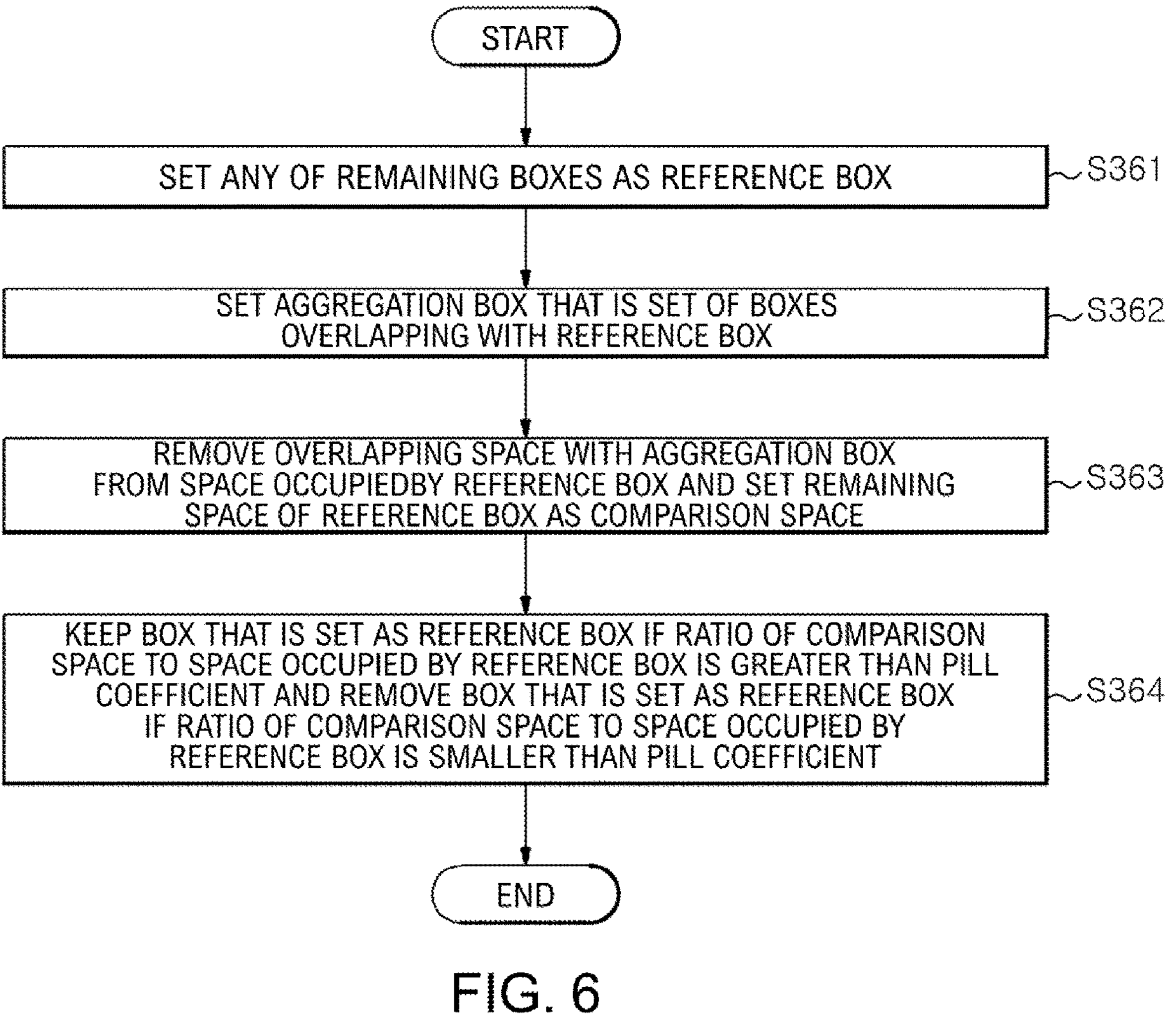
FIG. 6 is a flowchart illustrating in more detail an operation S36 of operations S32 to S36 of FIG. 5.
Figure 7:
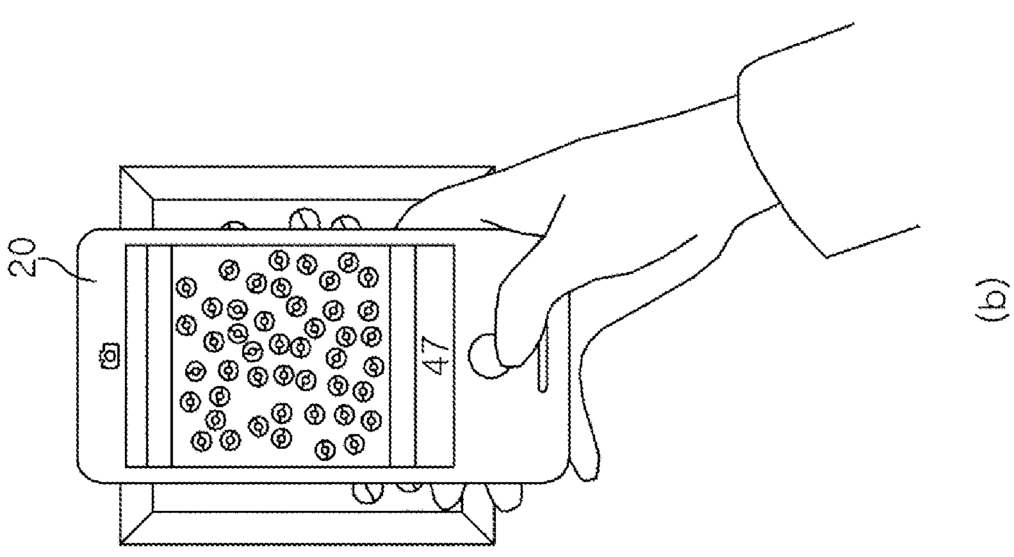
FIG. 7 conceptually illustrates inputting an object through the user terminal illustrated in FIG. 1.
Figure 7:
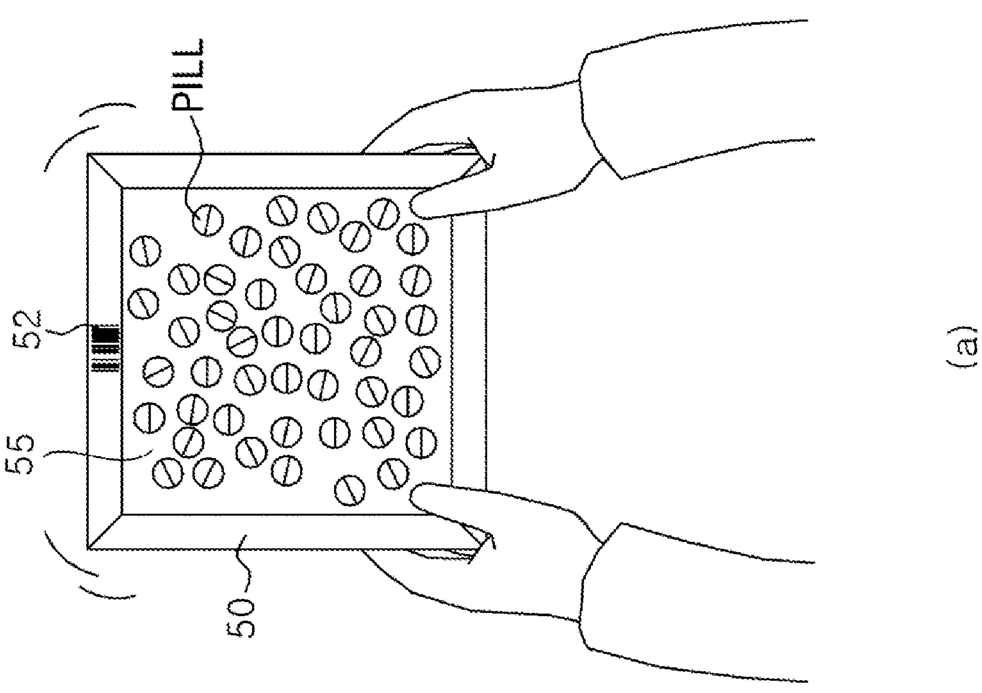
Figure 8:
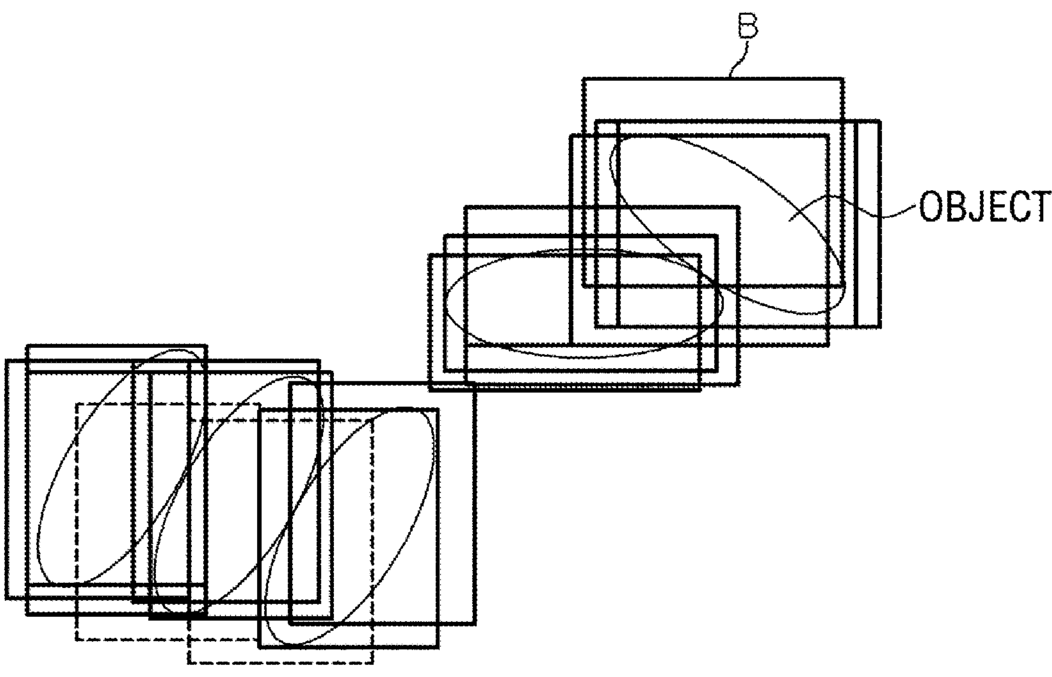
FIG. 8 conceptually illustrates a plurality of boxes formed for each of the pills by the image analysis server of FIG. 1 upon execution of an object recognition deep learning model, RetinaNet.
Figure 9:
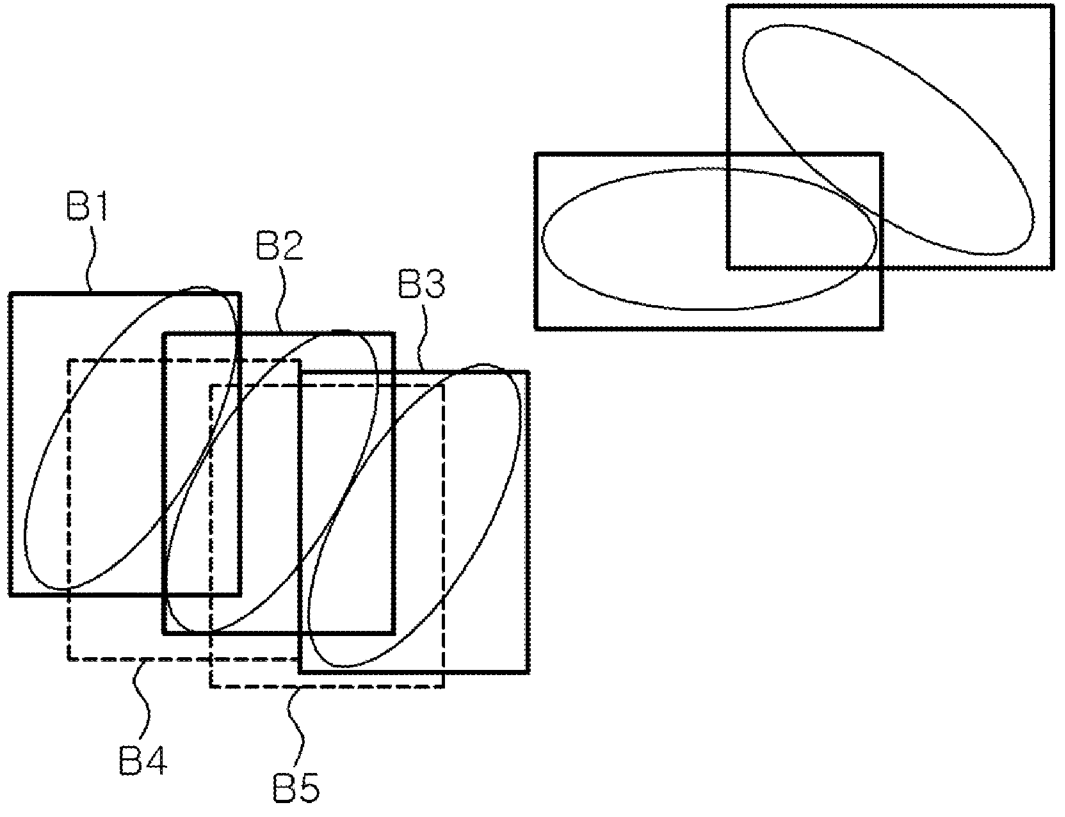
FIG. 9 conceptually illustrates boxes formed for each of the pills (objects) by the image analysis server of FIG. 1 upon execution of an algorithm for removing the boxes, that is, the non-maximum suppression (NMS)

FIG. 4 is a flowchart schematically illustrating an object counting method using an image analysis server, which is executed by the object counting system 1 of FIG. 1, FIG. 5 is a flowchart illustrating in more detail an operation S2 of operations S1 to S3 of FIG. 4, FIG. 6 is a flowchart illustrating in more detail an operation S36 of operations S32 to S36 of FIG. 5, FIG. 7 conceptually illustrates inputting an object through the user terminal 20 illustrated in FIG. 1, FIG. 8 conceptually illustrates a plurality of boxes formed for each of the pills by an object recognition deep learning model, RetinaNet, executed by the image analysis server 10 of FIG. 1, and FIG. 9 conceptually illustrates boxes formed for each of the pills (objects) by an algorithm for removing the boxes, that is, the non-maximum suppression (NMS), executed by the image analysis server 10 of FIG. 1.

Referring to FIGS. 4 and 9, the object counting method using the image analysis server may include by the user terminal 20, inputting an image including one or more objects, at S1, by the image analysis server 10, forming a plurality of boxes for each of the objects, and keeping a certain number of boxes that correspond to the object and deleting the other boxes of the plurality of the boxes, at S2, and by the image analysis server 10, counting the number of remaining boxes and transmitting the corresponding number of the remaining boxes to the user terminal 20, at S3.

The objects that are included in one image and can be counted by the image analysis server 10 may include the same type of objects having the same size and shape, or a plurality of types of objects having different sizes and shapes.

An example will be described herein, in which the objects included in one image counted by the image analysis server 10 is the same type of objects.

In addition, the process described above will be described in more detail by taking an example where the object is a pill.

First, the operation S1 of inputting an image including one or more objects (e.g., pills) by the user terminal 20 will be described in detail below.

User may place the same type of pills having the same size and shape on an object plate 50 (see FIG. 7A) and capture an image of the pills through the user terminal 20 (see FIG. 7B).

At this time, the pills should be placed on the object plate 50 so as not to overlap with each other.

However, the aspects are not limited to the above, and the object counting system 1 may include a function of notifying overlapping of the pills by a multi analysis auxiliary device 60 or the image analysis server 10 described later. Details will be described below.

The object plate 50 may be a flat plate on which pills can be placed, and may be provided in a color contrasting with the pill or a color different from that of the pill. For example, if white colored pills are provided, the object plate 50 may be provided in black.

The image including the pills captured by the user terminal 20 may be transmitted to the image analysis server 10.

An example will be described herein, in which the user is holding the user terminal 20 to capture an image, but aspects are not limited thereto, and the user terminal 20 may be placed on the multi analysis auxiliary device 60 to be described below to capture an image (see FIG. 14), and this will be described in detail below.

The operation S2 at the image analysis server 10 of forming a plurality of boxes for each of the objects (e.g., pills), and keeping a certain number of boxes that correspond to the object and deleting the other boxes of the plurality of the boxes will be described in detail below.

The image analysis server 10 may receive an image including a plurality of pills of the same type from the user terminal 20.

A plurality of boxes may be formed for each object, by the box setting module 310 of the image analysis server 10, at S32.

For example, the box setting module 310 may be provided as an artificial neural network that executes an object recognition deep learning model, RetinaNet. If RetinaNet is executed, a plurality of boxes may be formed for each pill. However, the object recognition deep learning model that can be executed by the box setting module 310 is not limited to RetinaNet, and the box setting module 310 may include executing one or more of CenterNet of YOLO.

Using the RetinaNet, it is possible to address the problems that may accompany the method of detecting an object using boxes, which can be caused when training the neural network due to the relatively smaller number of object samples compared to the number of background samples.

Specifically, RetinaNet may be an integrated network including a backbone network and two task-specific subnetworks. The backbone network plays a role of calculating a convolutional feature map for input entire image. The first subnet is a stage of performing object classification from the results of the backbone convolutionally, and the second subnet may play a role of estimating bounding boxes convolutionally.

FIG. 8 conceptually illustrates a plurality of boxes B formed for each of the pills (objects) upon execution of an object recognition deep learning model, RetinaNet, by the box setting module 310.

If RetinaNet is executed by the box setting module 310, for the pills placed close to each other, a plurality of boxes are formed for each of the pills, resulting in imbalance between the number of pills and the number of boxes. Therefore, in order to accurately count the pills including the pills placed close to each other, after RetinaNet is executed, it is necessary to perform a process of removing some of the boxes formed by RetinaNet.

Specifically, after RetinaNet is executed by the box setting module 310, an algorithm for removing some of a plurality of boxes formed for each object by the first box removal module 320 of the image analysis server 10 may be executed, at S34.

For example, the algorithm executed by the first box removal module 320 may be non-maximum suppression (NMS). In this case, the non-maximum suppression (NMS) may be understood as the algorithm that keeps a maximum value and removes a non-maximum value based on a comparison of the current pixel with the neighboring pixels.

FIG. 9 conceptually illustrates boxes formed for each of the pills (objects) by the first box removal module 320 upon execution of the algorithm for removing boxes, that is, the non-maximum suppression (NMS).

If the pills are placed very close to each other, even after the execution of the non-maximum suppression (NMS), the number of pills and the number of boxes may differ from each other.

For example, referring to FIG. 9, it can be seen that five boxes B1, B2, B3, B4, and B5 are formed for three pills that are placed very close to each other. In this case, by the second box removal module 330, an operation of keeping only one box for each of the objects and deleting the other boxes may be performed, at S36. In this example, the second box removal module 330 may include the reference box setting unit 331, the aggregation box setting unit 332, the comparison space setting unit 333, and the pill coefficient comparison-based box removal unit 334, and with this configuration, the operation S36 may be performed as described below (see FIG. 6).

Specifically, the operation S36 may include, by the reference box setting unit 331, setting any of the remaining boxes as a reference box, at S361, by the aggregation box setting unit 332, setting an aggregation box which is a set of the boxes overlapping with the reference box, at S362, by the comparison space setting unit 333, removing an overlapping space with the aggregation box from a space occupied by the reference box and setting the remaining space of the reference box as a comparison space, at S363, and by the pill coefficient comparison-based box removal unit 334, if a ratio of the comparison space to the space occupied by the reference box is greater than a pill coefficient, keeping the box that is set as the reference box, and if the ratio of the comparison space to the space occupied by the reference box is smaller than the pill coefficient, removing the box that is set as the reference box, at S364 (see FIG. 5).

Figure 10:
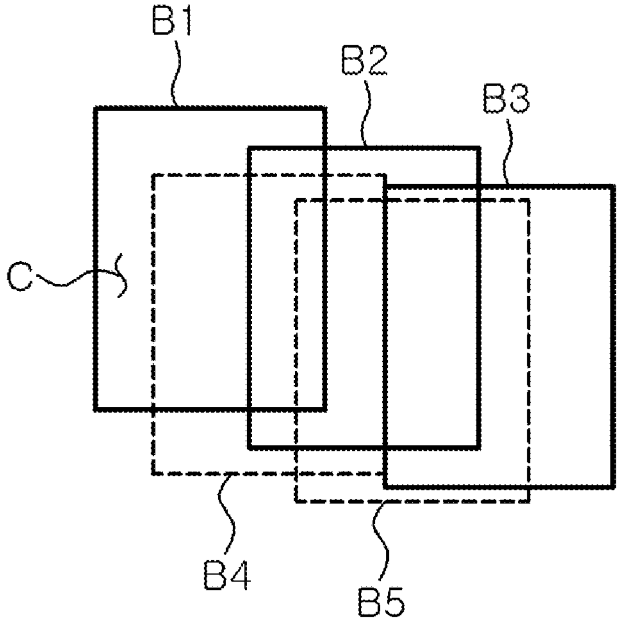
FIG. 10 is a conceptual diagram provided to help understand the operation S36 illustrated in FIG. 6.

FIG. 10 is a conceptual diagram provided to help understand the operation S36 illustrated in FIG. 6.

Referring to FIGS. 1 to 10, the operation S36 will be described by referring to the following example.

If the operation S34 is executed by the first box removal module 320, the number of boxes formed for the pills placed close to each other may be greater than the number of pills (e.g., 5 boxes B1 to B5 are formed for 3 pills)

In this case, any of the five remaining boxes B1 to B5, e.g., a first box B1 is set as the reference box, and second box B2, fourth box B4, and fifth box B5, which are overlapped with the first box B1, are set as aggregation boxes.

The overlapping space of the first box B1 with the aggregation boxes B2, B4, and B5 is removed from the space occupied by the first box B1, and the remaining space is set as the comparison space C.

Since the ratio of the space occupied by the comparison space C to the reference box, that is, to the first box B1 is greater than the pill coefficient (comparison space C/space occupied by the reference box B1)>pill coefficient), the reference box, that is, the first box B1 may remain.

In this example, the pill coefficient represents a space in which the object (pill) can be present, and may be set differently depending on the size and shape of the object (pill), and the pill coefficient may be set to a value between 0 and 1 (e.g., the pill coefficient may be 0.85).

The pill coefficient may be set by the pill coefficient determination module 340 of the image analysis server 10.

Specifically, the pill coefficients according to the sizes and shapes of the object (pill) may be stored in the database 210, and if an image including an object (e.g., pill) is transmitted from the user terminal 20 to the image analysis server 10, the pill coefficient determination module 340 may match the pill coefficients stored in the database 210 according to the size and shape of the object (e.g., the pill), thereby setting the pill coefficient differently according to the type of the object. Theoretically, the pill coefficient may increase between 0 and 1 as the size of the pill increases.

Likewise, if the fourth box B4 is set as the reference box, the ratio of the comparison space to the space occupied by the reference box (i.e., the fourth box B4) is smaller than the pill coefficient, and accordingly, the fourth box B4 set as the reference box may be removed.

As described above, through the operations S361 to S364, even when there are the objects placed close to each other, it is possible to have the boxes in the same number as the objects.

In addition, by the image analysis server 10, the operation S3 of counting remaining boxes and transmitting the number corresponding to the boxes to the user terminal 20 may be performed.

Specifically, the counting module 350 of the image analysis server 10 may count the remaining boxes and transmit the counted number to the user terminal 20, and the user terminal 20 may display the counted number or pass it to the user in a voice through the speaker.

In addition, the types of objects analyzed by the image analysis server 10 and the number of counted objects may be matched to each other and stored in the database 210, and the user may also search the history of the types of objects and the counted number of objects through the user terminal 20.

Through this process, if the user simply captures an image of dozens to tens of thousands of pills and transmit the image to the image analysis server 10, the exact number of pills can be counted and informed to the user, and the time spent on inventory of pills in pharmacies or hospitals can be reduced.

In addition, the processor described above may be installed in the user terminal 20 in the form of an application or provided as a web page, and if the user simply downloads the application or connects to the web page and uploads an image, the number of pills included in the image may be automatically transmitted to the user.

Hereinafter, the sub-components of the above-described image analysis server 10, that is, the box setting module 310, the first box removal module 320, the second box removal module 330, the pill coefficient determination module 340, and the counting module 350 will be described in detail.

As described above, the box setting module 310 may execute an object recognition deep learning model to form a plurality of boxes for each of the objects.

The first box removal module 320 may execute an algorithm for removing some of a plurality of boxes formed for each object.

The second box removal module 330 may keep only one box for each object and delete the remaining boxes.

Specifically, the second box removal module 330 may include the reference box setting unit 331, the aggregation box setting unit 332, the comparison space setting unit 333, and the pill coefficient comparison-based box removal unit 334, and the reference box setting unit 331 may set any of the remaining boxes as the reference box.

The aggregation box setting unit 332 may set an aggregation box which is a set of boxes overlapping with the reference box.

The comparison space setting unit 333 may remove the overlapping space with the aggregation box from the space occupied by the reference box and set the remaining space of the reference box as the comparison space.

If the ratio of the comparison space to the space occupied by the reference box is greater than a pill coefficient, the pill coefficient comparison-based box removal unit 334 may keep the box that is set as the reference box, and if the ratio of the comparison space to the space occupied by the reference box is smaller than the pill coefficient, the pill coefficient comparison-based box removal unit 334 may remove the box that is set as the reference box.

The pill coefficient determination module 340 may match the pill coefficient stored in the database 210 according to the size and shape of the object appearing in the image.

The counting module 350 may count the number of boxes corresponding to the object and transmit the counted number to the user terminal 20.

Figure 11:
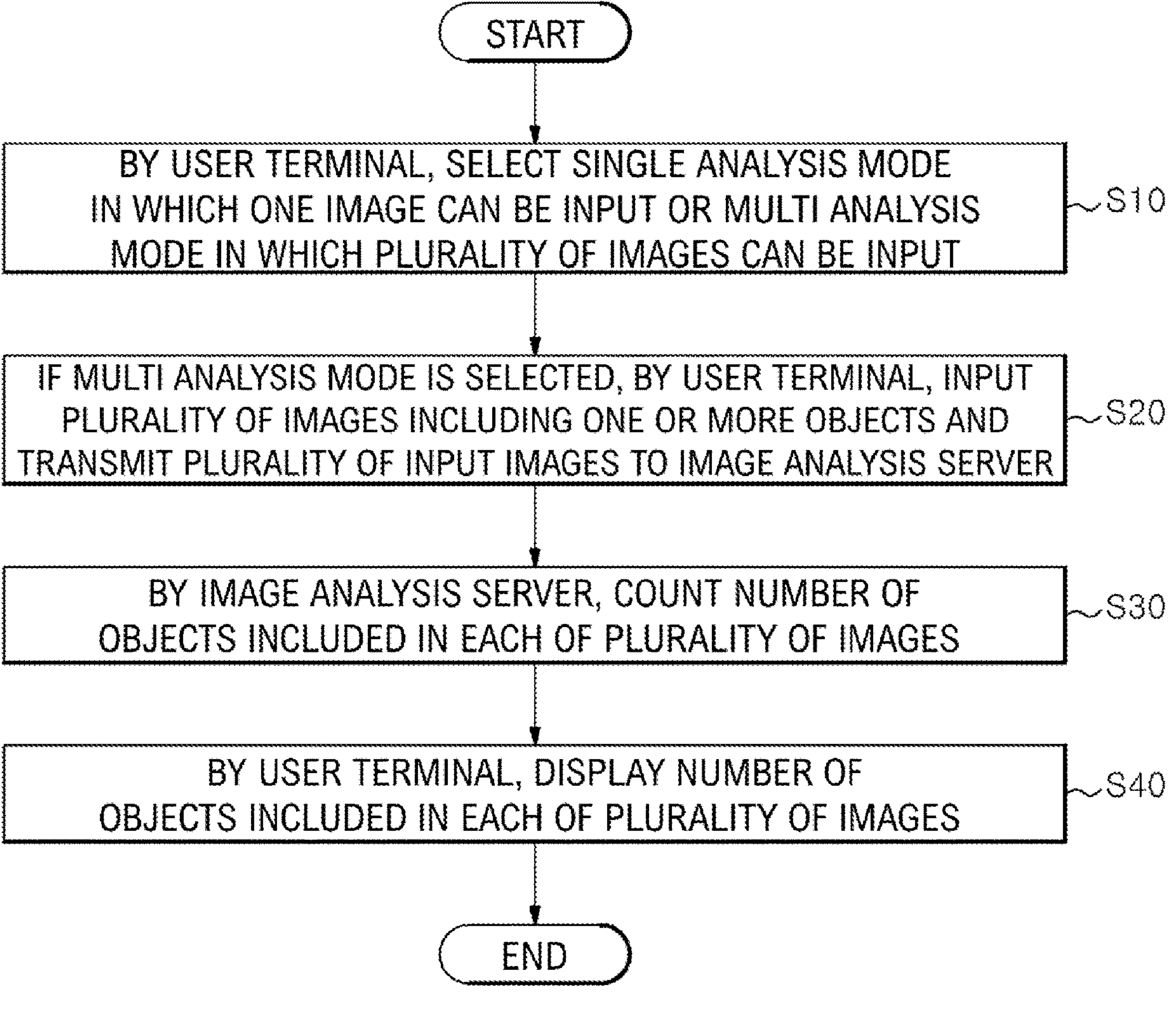
FIG. 11 schematically illustrates a flowchart of transmitting a plurality of images to an image analysis server and counting one or more objects included in each of the plurality of images, by using the object counting system of FIG. 1.
Figure 12:
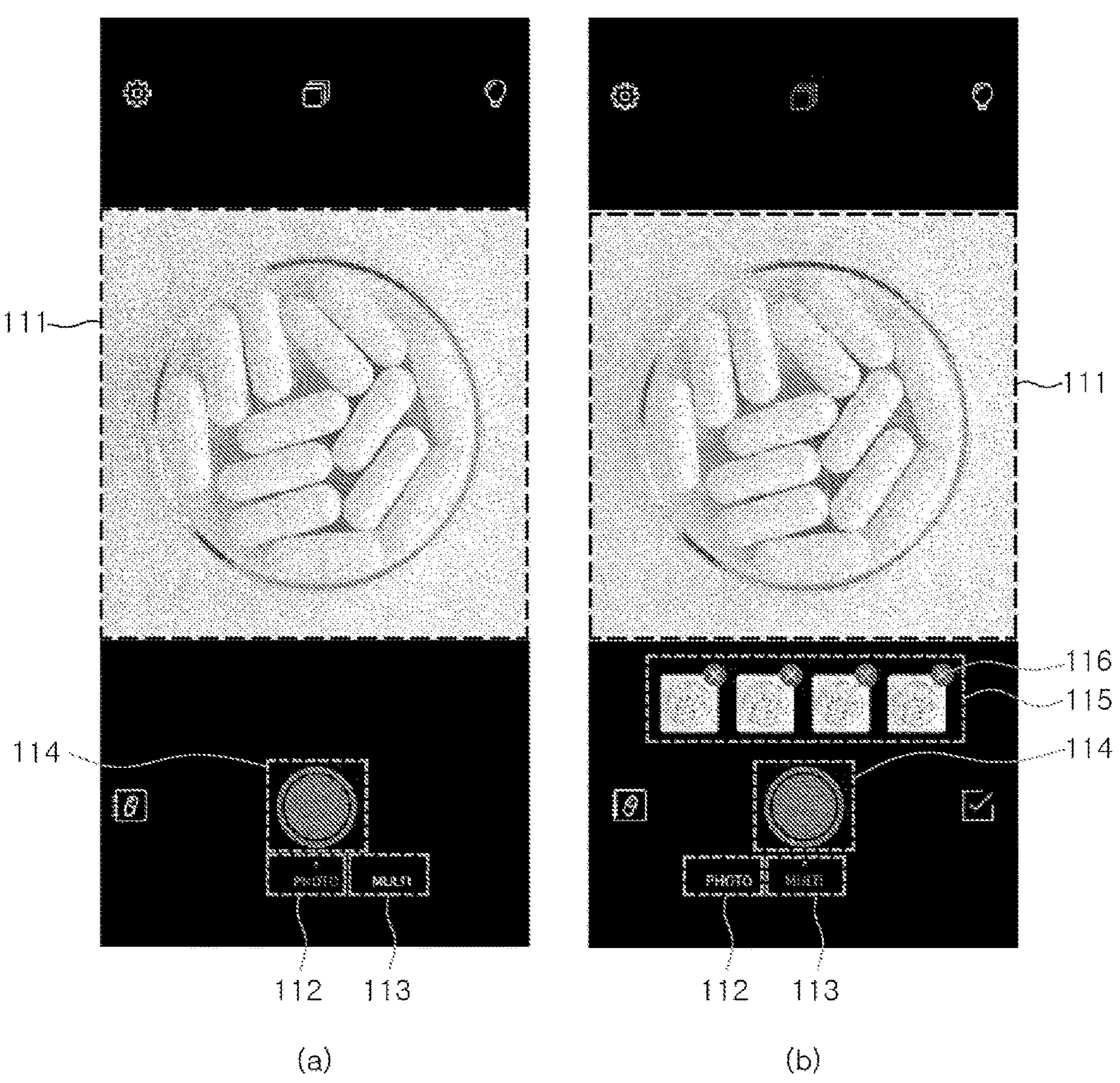
FIG. 12 illustrates a screen displayed on the user terminal of FIG. 1 in a single analysis mode and a multi analysis mode.
Figure 13:
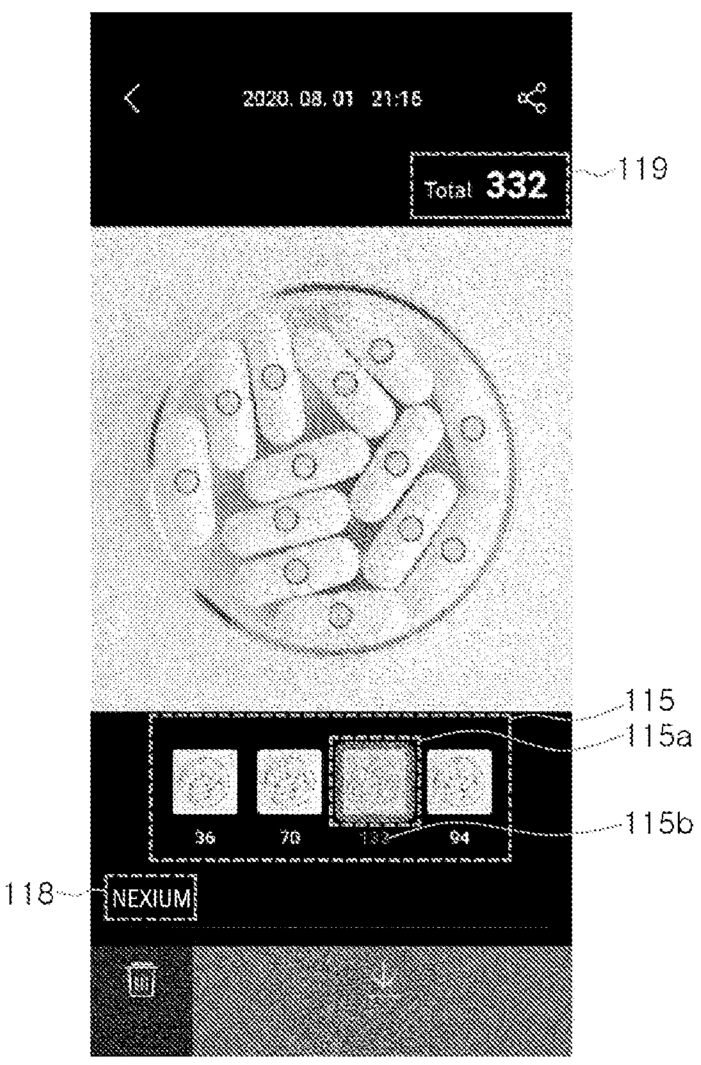
FIG. 13 illustrates displaying, on the screen of the user terminal of FIG. 1, the number and type of objects included in each of a plurality of images analyzed by the image analysis server in the multi analysis mode.

FIG. 11 schematically illustrates a flowchart of transmitting a plurality of images to the image analysis server 10 and counting one or more objects included in each of the plurality of images, by using the object counting system 1 of FIG. 1, FIG. 12 illustrates a screen displayed on the user terminal 20 of FIG. 1 in a single analysis mode and a multi analysis mode, and FIG. 13 illustrates displaying, on the screen of the user terminal 20 of FIG. 1, the number and type of objects included in each of a plurality of images analyzed by the image analysis server 10 in the multi analysis mode.

The object counting system 1 has been described above by referring to the example in which one image is transmitted to the image analysis server 10 through the user terminal 20 and a plurality of objects included in the one image are analyzed with the image analysis server 10, and the object counting system 1 will now be described below by referring to an example in which a plurality of images are transmitted to the image analysis server 10 and a plurality of objects included in each of the plurality of images are analyzed.

Before describing the method for counting objects included in a plurality of images using the image analysis server, a screen of the user terminal 20 will be described below with reference to FIGS. 12 and 13.

The screen of the user terminal 20 may include an image enlargement unit 111, a single analysis button 112, a multi analysis button 113, an image input button 114, a multi analysis window 115, and a total number display unit 119.

An image being captured or has been captured by the user terminal 20 may be displayed on the image enlargement unit 111.

A plurality of images captured by the user terminal 20 may be displayed on the multi analysis window 115, and the number of objects for each image analyzed by the image analysis server 10 may be displayed.

In addition, the multi analysis window 115 may be provided with an image selection window 115*a* for selecting each image, and a number display unit 115*b* for displaying the number of each images analyzed by the image analysis server 10. In addition, the multi analysis window 115 may be provided with a delete button 116 for deleting each image.

A type display unit 118 may display the type of object included in the image selected by the image selection window 115*a*.

The total number display unit 119 may display the sum of objects included in all of the plurality of images displayed on the multi analysis window 115.

Referring to FIGS. 11 to 13, the method for counting objects included in a plurality of images using the image analysis server may include by the user terminal 20, selecting a single analysis mode in which one image can be input or a multi analysis mode in which a plurality of images can be input, at S10, if the multi analysis mode is selected, by the user terminal 20, inputting a plurality of images including one or more objects and transmitting the plurality of input images to the image analysis server 10, at S20, by the image analysis server 10, counting the number of objects included in each of the plurality of images, at S30, and by the user terminal 20, displaying the number of objects included in each of the plurality of images, at S40.

First, details of the operation S10 by the user terminal 20 of selecting the single analysis mode in which one image can be input or the multi analysis mode in which a plurality of images can be input will be described below.

The user may select the single analysis mode or the multi analysis mode through the user terminal 20.

Specifically, the user may touch or click the single analysis button 112 displayed on the screen of the user terminal 20 so as to execute the single analysis mode, and touch or click the multi analysis button 113 so as to execute the multi analysis mode.

If the single analysis mode is selected, it may be understood that only one image is captured through the user terminal 20 and the one image is transmitted to the image analysis server 10 such that only one image is analyzed.

In addition, if the multi analysis mode is selected, it may be understood that a plurality of images are captured by the user terminal 20, and the plurality of images are transmitted to the image analysis server 10 such that all of the plurality of images are analyzed.

In addition, if the multi analysis mode is selected, the user terminal 20 may be provided with an input window (not illustrated) for selecting the number of images to be captured, and in this case, the number of images as selected by the user may be captured and generated.

For example, if 5 types of pills need to be provided to patient A, the user may input 5 in the input window, and if 5 images are input, the 5 images may be transmitted to the image analysis server 10.

Details of the operation S20 of inputting a plurality of images including one or more objects and transmitting the plurality of input images to the image analysis server 10 by the user terminal 20 in response to selecting the multi analysis mode will be described below.

If the user selects the multi analysis mode, the multi analysis window 115 is activated on the screen of the user terminal 20, and a plurality of captured images may be displayed on the multi analysis window 115.

The user may edit a plurality of images displayed on the multi analysis window 115. For example, the user may touch or click the delete button 116 of the multi analysis window 115 to delete an image that is not to be analyzed.

If a plurality of images including one or more pills are input (captured) by the user terminal 20, the user may input the types of pills displayed in the images through the user terminal 20. However, the aspects are not limited to the above, and the types of the pills may be automatically recognized by the multi analysis auxiliary device 60 and/or the image analysis server 10 which will be described below. Details will be described below.

The plurality of images input as described above may be transmitted to the image analysis server 10.

The operation S30 of counting the number of objects included in each of a plurality of images by the image analysis server 10 will be described.

Specifically, the operation S30 may include by the image analysis server 10, forming a plurality of boxes for each object included in each of the plurality of images, and keeping only the number of boxes that correspond to the object and deleting the other boxes of the plurality of boxes formed in each image, and by the image analysis server 10, counting the number of boxes remaining in each of the plurality of images and transmitting the number corresponding to the remaining boxes in each of the plurality of images to the user terminal 20.

In this example, the method for counting objects included in each of the images is the same as the operations S2 and S3 described above, and accordingly, a detailed description thereof will be substituted for the above description of the operations S2 and S3.

Next, the operation S40 of displaying the number of objects included in each of a plurality of images by the user terminal 20 will be described.

Specifically, the operation S40 may include displaying a plurality of images in the multi analysis window 115 of the user terminal 20, displaying the number of objects included in each of the plurality of images on the multi analysis window 115 of the user terminal 20, displaying the types of the objects included in each of the plurality of images on the type display unit 118 of the user terminal 20, and displaying the sum of the objects included in all of the plurality of images on the total number display unit 119 of the user terminal 20 (see FIG. 13).

For example, 4 images are displayed on the multi analysis window 115, and the number of the pills is displayed on one side (e.g., the bottom) of each image.

In addition, the type display unit 118 may be provided on one side of the multi analysis window 115, and the type of the selected image (e.g., Nexium tablet) may be displayed on the type display unit 118. At this time, the image selected from the plurality of images displayed on the multi analysis window 115 may be displayed in a different color from the non-selected images.

Meanwhile, the object counting system 1 of this example may further include the multi analysis auxiliary device 60 and a moving belt 70 for inputting a plurality of images in the multi analysis mode of the operation S10 described above.

Figure 14:
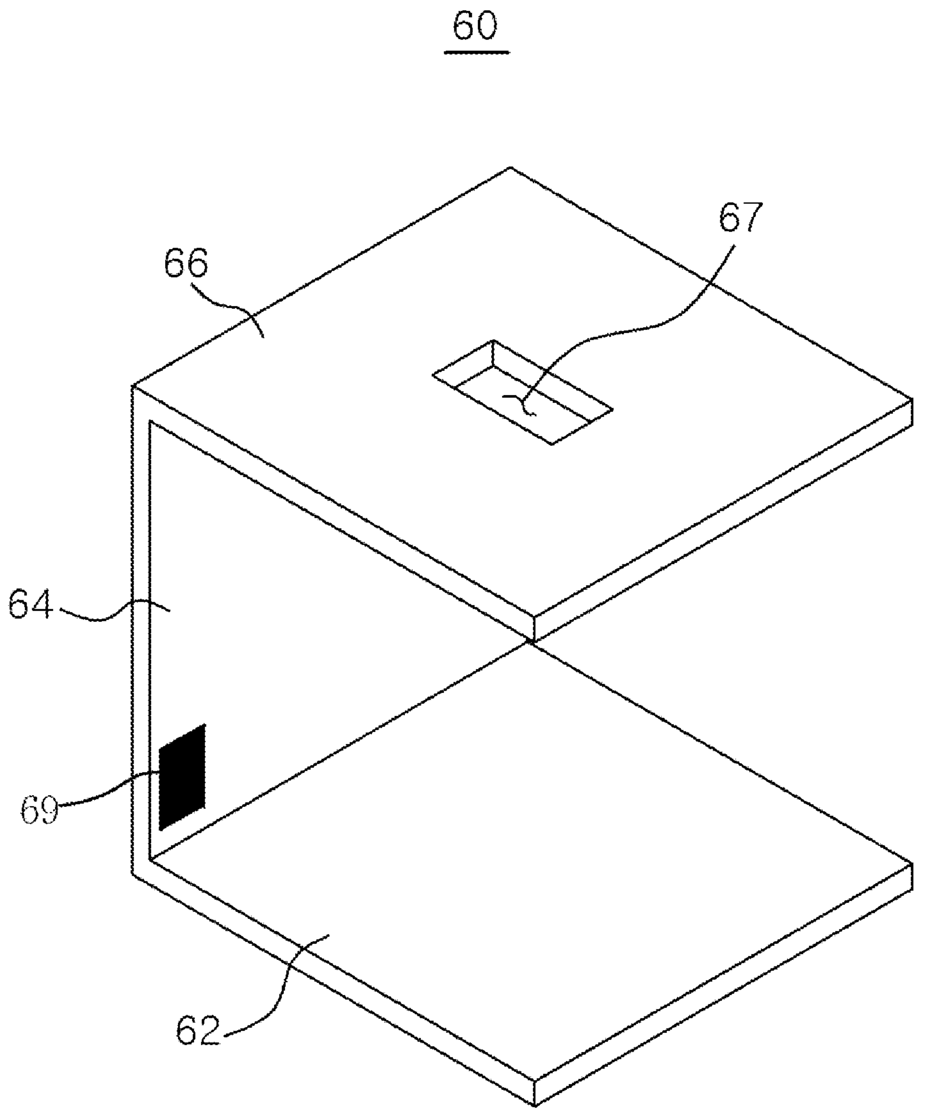
FIG. 14 schematically illustrates a multi analysis auxiliary device on which the user terminal of FIG. 1 can be seated.
Figure 15:
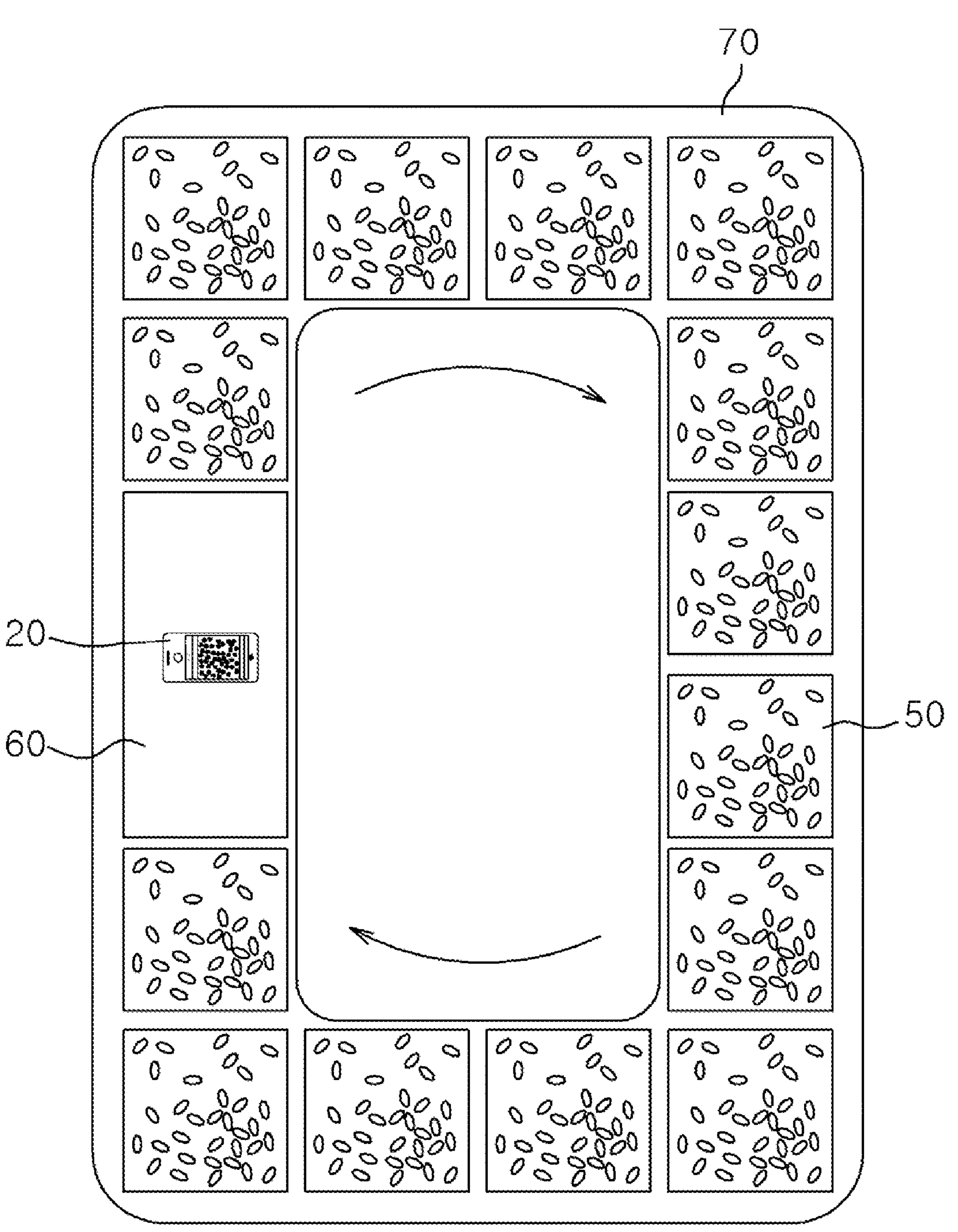
FIG. 15 schematically illustrates the multi analysis auxiliary device of FIG. 14 and a moving belt for facilitating the performance of the multi analysis mode.

FIG. 14 schematically illustrates the multi analysis auxiliary device 60 on which the user terminal 20 of FIG. 1 can be seated, and FIG. 15 schematically illustrates the multi analysis auxiliary device 60 and the moving belt 70 of FIG. 14 for facilitating the performance of the multi analysis mode.

Referring to FIGS. 14 and 15, the object counting system 1 may further include the multi analysis auxiliary device 60 and the moving belt 70 for facilitating the performance of the multi analysis mode.

The multi analysis auxiliary device 60 may be understood as a device on which the user terminal 20 can be seated, and the moving belt 70 may be understood as a device capable of moving a plurality of object plates 50.

If the multi analysis auxiliary device 60 and the moving belt 70 illustrated in FIGS. 14 and 15 are provided, the operation S20 of inputting a plurality of images including one or more objects by the user terminal 20 described above can be easily implemented.

Specifically, the operation of inputting a plurality of images including one or more objects by the user terminal 20 may include seating the user terminal 20 on a terminal seating portion 67 of the multi analysis auxiliary device 60, seating a plurality of object plates 50 on which objects are placed on the moving belt 70, sequentially positioning the plurality of object plates 50 under the user terminal 20 according to the movement of the moving belt 70, and moving the plurality of object plates 50 to under the user terminal 20 such that each of the object plates 50 is stayed under the user terminal 20 for a certain period of time and then moved along, and, by the user terminal 20, capturing images of the objects placed on each object plate 50 and generating a plurality of images.

In addition, although it is described by way of an example that the number of the same type of objects is counted, if the object plate 50 including a type identification tag 52 is used, the object counting system 1 may determine objects of different types.

Specifically, the type identification tag 52 may be provided in one or more of letters, bar codes, and certain symbols on one side of the object plate 50. The type of object (pill) may be determined by the type identification tag 52.

For example, the user may place different types of pills on the object plates 50 according to the type identification tags 52 attached to the object plates 50, and the user terminal 20 may capture the type identification tag 52 of the object plate 50 to generate an image including both the type identification tag 52 and the object, or generate an image including the object and an image including the type identification tag 52 respectively, and analyze the image by matching the type identification tag 52 with the object using the image analysis server 10, thereby determining the type and number of objects. In this example, the processor 300 of the image analysis server 10 may further include the type determination module 360 capable of determining the type identification tag 52.

In this case, after the operation S30 of counting the number of objects included in each of the plurality of images by the image analysis server 10 described above, by the type determination module 360 of the image analysis server 10, an operation of determining the type of the object by matching the object with the type identification tag 52 may be performed, and by the user terminal 20, an operation of displaying the number and type of objects included in each of the plurality of images may be performed.

Specifically, data on the type of object according to the type identification tag 52 may be stored in the database 210, and the type determination module 360 may receive the data on the type of object stored in the database 210 and determine the type of object.

For example, if the type identification tag 52 is provided as a symbol 1234 and the database 210 stores the type of object corresponding to the symbol 1234 as a Nexium tablet, the user may place the Nexium tablet on the object plate 50 having the symbol 1234 marked thereon, and accordingly, by the image analysis server 10, it is easy to recognize the type of the object without any cumbersome work.

Hereinafter, a physical device capable of determining the type of object described above will be described in more detail.

The object counting system 1 may include the object plate 50 that provides a space for placing an object and includes the type identification tag 52 provided in one or more of letters, bar codes, and certain symbols, the user terminal 20 capable of capturing an image of the object plate 50 and generating an image including one or more objects placed on the object plate 50 and an image including the type identification tag 52, and the image analysis server 10 capable of determining the number and type of the objects included in the image. In this example, the object and the type identification tag 52 may be captured in one image or may be captured in separate images.

The object plate 50 may include a flat seating portion 55 on which the objects can be placed, and the type identification tag 52 formed outside the seating portion 55 and provided in one or more of letters, bar codes, and certain symbols.

In addition, the object counting system 1 may further include the multi analysis auxiliary device 60 including the terminal seating portion 67 which is spaced apart from the object plate 50 by a preset distance and on which the user terminal 20 may be placed.

The multi analysis auxiliary device 60 may include a bottom portion 62 along which the object plate 50 is moved, a top portion 66 including the terminal seating portion 67 on which the user terminal 20 may be placed, and a side portion 64 connecting the bottom portion 62 and the top portion 66. In this case, the height of the side portion 64 may be understood as a distance between the object plate 50 and the user terminal 20 spaced apart from each other, and the side portion 64 may be adjustable in height.

If this multi analysis auxiliary device 60 is used, the user terminal 20 may be placed on the terminal seating portion 67 and capture an object to generate an image, which may facilitate capturing an image of the object placed on the object plate 50.

In addition, the multi analysis auxiliary device 60 may include a sensor 69 capable of determining overlapping of objects placed on the object plate 50.

For example, the sensor 69 may be provided on the side portion 64 of the multi analysis auxiliary device 60, the object plate 50 may be moved along in front of the sensor 69, and the sensor 69 may scan the height of the object placed on the object plate 50 as the object plate 50 is moved along. In this case, the height of the object may be understood as a length measured in a vertical direction from the seating portion 55 of the object plate 50.

That is, it may be understood that the image captured by the user terminal 20 is obtained as a result of capturing an image of one side (top surface) of the object, and that the sensor 69 attached to the multi analysis auxiliary device 60 scans the another side (side) of the object.

As the object plate 50 is moved along in front of the sensor 69, the sensor 69 may scan all the objects placed on the object plate 50 and notify the user if an object exceeding a certain range is scanned among the objects placed on the object plate 50.

The multi analysis auxiliary device 60 may be provided with a speaker (not illustrated) connected to the sensor 69 to notify the user with a warning sound, or a signal may be transmitted from the sensor 69 to the user terminal 20 so as to give a warning sound or indication the user through the user terminal 20.

In this case, the user can check the objects placed on the object plate 50 and place the objects differently so that the objects do not overlap with each other.

In addition, the object counting system 1 may further include the moving belt 70 on which the plurality of object plates 50 are seated and which can move the plurality of object plates 50 to under the user terminal 20.

In this case, the moving belt 70 may be provided in a closed curve. In this case, by placing the plurality of object plates 50 on the moving belt 70 forming a closed curve, the number of pills may be counted using the plurality of object plates 50.

In addition, if the plurality of object plates 50 are provided, the seating portions 55 of the plurality of object plates 50 may be colored differently.

For example, the object plate 50 on which a red-type object is placed may be provided in a green-type color, and the color of the seating portion 55 of the object plate 50 on which a white-type object is placed may be provided in a black-type color. In this case, the image analysis server 10 may recognize the object more easily by distinguishing the object from the background color.

Although the image analysis server 10, the object counting system 1 including the same, the object counting method using the image analysis server, and the method for counting the objects included in a plurality of images using the image analysis server have been described above by referring to specific examples, these are merely examples, and the present disclosure should be interpreted as having the widest scope according to the basic idea disclosed herein without being limited to certain examples. A person skilled in the art may implement an example that is not described herein by combining or substituting the disclosed examples, but this also does not deviate from the scope of the present disclosure. In addition, those skilled in the art may easily change or modify the disclosed examples based on the description, and it is clear that such changes or modifications also fall within the scope of the present disclosure.

What is claimed is:

1. A method performed by a computing device, the method comprising:

receiving, by the computing device, an image including one or more objects;

generating a plurality of boxes associated with the one or more objects and corresponding to different portions of the image by:

providing, as input to an object recognition algorithm implemented via an artificial neural network, the image; and receiving, as output from the object recognition algorithm, indications of the plurality of boxes;

based on determining that at least a portion of the plurality of boxes in the output overlap:

keeping one or more first boxes, of the plurality of boxes, corresponding to the one or more objects; and deleting one or more second boxes, of the plurality of boxes, corresponding to the one or more objects by:

based on determining that at least one of the one or more second boxes at least partially overlaps with at least one of the one or more first boxes, identifying a portion of the at least one of the one or more second boxes that does not overlap the at least one of the one or more first boxes;

determining a ratio of the portion to a total area of the at least one of the one or more second boxes; and based on the ratio being less than a coefficient, deleting the at least one of the one or more second boxes, wherein the coefficient is based on an expected shape of the one or more objects; and transmitting, to a user terminal, information indicating a count of the one or more first boxes.

2. The method according to claim 1, wherein the generating the plurality of boxes comprises calculating a convolutional feature map for the image.

3. The method according to claim 1, wherein a quantity of the one or more first boxes corresponds to a predicted quantity of the one or more objects.

4. The method according to claim 1, wherein the keeping the one or more first boxes comprises keeping only one box for each object of the one or more objects.

5. The method according to claim 1, wherein the keeping the one or more first boxes and the deleting the one or more second boxes comprises:

setting a box of the plurality of boxes as a reference box; and determining, based on a set of boxes overlapping the reference box, whether to keep or delete the reference box.

6. The method according to claim 1, wherein the object recognition algorithm implemented via the artificial neural network is a RetinaNet algorithm.

7. The method according to claim 1, wherein the deleting the one or more second boxes comprises executing a non-maximum suppression (NMS) algorithm.

8. The method according to claim 5, wherein the coefficient is further based on a size of the one or more objects.

9. An image analysis server comprising:

one or more processors; and memory storing instructions that, when executed by the one or more processors, cause the image analysis server to:

receive, from a user terminal, an image including one or more objects;

generate a plurality of boxes associated with the one or more objects corresponding to different portions of the image by:

providing, as input to an object recognition algorithm implemented via an artificial neural network, the image; and receiving, as output from the object recognition algorithm, indications of the plurality of boxes;

based on determining that at least a portion of the plurality of boxes in the output overlap:

keep one or more first boxes, of the plurality of boxes, corresponding to the one or more objects; and delete one or more second boxes, of the plurality of boxes, corresponding to the one or more objects by:

based on determining that at least one of the one or more second boxes at least partially overlaps with at least one of the one or more first boxes, identifying a portion of the at least one of the one or more second boxes that does not overlap the at least one of the one or more first boxes;

determining a ratio of the portion to a total area of the at least one of the one or more second boxes; and based on the ratio being less than a coefficient, deleting the at least one of the one or more second boxes, wherein the coefficient is based on an expected shape of the one or more objects; and transmit, to the user terminal, information indicating a count of the one or more first boxes.

10. The image analysis server according to claim 9, wherein the instructions, when executed by the one or more processors, cause the image analysis server to generate the plurality of boxes by calculating a convolutional feature map for the image.

11. The image analysis server according to claim 9, wherein a quantity of the one or more first boxes corresponds to a predicted quantity of the one or more objects.

12. The image analysis server according to claim 9, wherein the instructions, when executed by the one or more processors, cause the image analysis server to keep the one or more first boxes by causing the image analysis server to keep only one box for each object of the one or more objects.

13. The image analysis server according to claim 9, wherein the instructions, when executed by the one or more processors, cause the image analysis server to keep the one or more first boxes and delete the one or more second boxes by causing the image analysis server to:

set a box of the plurality of boxes as a reference box; and determine, based on a set of boxes overlapping the reference box, whether to keep or delete the reference box.

14. The image analysis server according to claim 9, wherein the object recognition algorithm implemented via the artificial neural network is a RetinaNet algorithm.

15. The image analysis server according to claim 9, wherein the instructions, when executed by the one or more processors, cause the image analysis server to delete the one or more second boxes by causing the image analysis server to execute a non-maximum suppression (NMS) algorithm.

16. The image analysis server according to claim 13, wherein the coefficient is further based on a size of the one or more objects.

17. One or more non-transitory computer-readable media storing instructions that, when executed by one or more processors of a computing device, cause the computing device to:

receive, from a user terminal, an image including one or more objects;

generate a plurality of boxes associated with the one or more objects corresponding to different portions of the image by:

providing, as input to an object recognition algorithm implemented via an artificial neural network, the image; and receiving, as output from the object recognition algorithm, indications of the plurality of boxes;

based on determining that at least a portion of the plurality of boxes in the output overlap:

keep one or more first boxes, of the plurality of boxes, corresponding to the one or more objects; and delete one or more second boxes, of the plurality of boxes, corresponding to the one or more objects by:

based on determining that at least one of the one or more second boxes at least partially overlaps with at least one of the one or more first boxes, identifying a portion of the at least one of the one or more second boxes that does not overlap the at least one of the one or more first boxes;

determining a ratio of the portion to a total area of the at least one of the one or more second boxes; and based on the ratio being less than a coefficient, deleting the at least one of the one or more second boxes, wherein the coefficient is based on an expected shape of the one or more objects; and transmit, to the user terminal, information indicating a count of the one or more first boxes.

18. The one or more non-transitory computer-readable media of claim 17, wherein the instructions, when executed by the one or more processors, cause the computing device to generate the plurality of boxes by calculating a convolutional feature map for the image.

19. The one or more non-transitory computer-readable media of claim 17, wherein a quantity of the one or more first boxes corresponds to a predicted quantity of the one or more objects.

20. The one or more non-transitory computer-readable media of claim 17, wherein the instructions, when executed by the one or more processors, cause the computing device to keep the one or more first boxes by causing the computing device to keep only one box for each object of the one or more objects.

* * * * *